United States Patent
Bakri (10) Patent No.: US 7,400,885 B2
(45) Date of Patent: Jul. 15, 2008

(54) METHOD AND APPARATUS FOR HANDING OVER A SUBSCRIBER UNIT BETWEEN CELLULAR COMMUNICATION SYSTEMS

(75) Inventor: Ban Al Bakri, Juan les Pins (FR)

(73) Assignee: Motorola, Inc., Schaumburg, IL (US)

( * ) Notice: Subject to any disclaimer, the term of this patent is extended or adjusted under 35 U.S.C. 154(b) by 55 days.

(21) Appl. No.: 10/530,309

(22) PCT Filed: Oct. 3, 2003

(86) PCT No.: PCT/EP03/50688

§ 371 (c)(1),
(2), (4) Date: Apr. 4, 2005

(87) PCT Pub. No.: WO2004/036947

PCT Pub. Date: Apr. 29, 2004

(65) Prior Publication Data
US 2006/0084440 A1   Apr. 20, 2006

(30) Foreign Application Priority Data
Oct. 17, 2002   (EP)   ................................ 02292562

(51) Int. Cl.
*H04Q 7/20* (2006.01)
(52) U.S. Cl. ...................... 455/436; 455/432.1; 370/331
(58) Field of Classification Search ............... 455/432.1, 455/445, 456.6, 453, 456.1, 436–444; 370/331–334
See application file for complete search history.

(56) References Cited

U.S. PATENT DOCUMENTS

| | | | |
|---|---|---|---|
| 5,664,007 A | | 9/1997 | Samadi et al. |
| 5,850,606 A | * | 12/1998 | Bedingfield et al. ......... 455/439 |
| 6,385,451 B1 | | 5/2002 | Kalliokulju et al. |
| 6,687,249 B1 | * | 2/2004 | Noguera-Rodriguez et al. ....... 370/395.1 |
| 6,725,039 B1 | * | 4/2004 | Parmar et al. ............... 455/436 |
| 6,792,273 B1 | * | 9/2004 | Tellinger et al. ............ 455/442 |
| 7,003,298 B1 | * | 2/2006 | Jagadeesan ................. 455/442 |
| 2003/0169725 A1 | * | 9/2003 | Ahmavaara et al. ......... 370/352 |

FOREIGN PATENT DOCUMENTS

| | | |
|---|---|---|
| WO | WO 00/32001 A | 6/2000 |
| WO | WO 01/65881 A | 9/2001 |

OTHER PUBLICATIONS

ETSI: "Handover Requirements between UMTS and GSM or other Radio Systems (3G TS 22.129 version 3.2.0)", European Telecommunication Standard, XX, XX, Dec. 1999, pp. 1-20.

* cited by examiner

*Primary Examiner*—Joseph Feild
*Assistant Examiner*—Jaime M. Holliday (57) ABSTRACT

The invention relates to handover of a subscriber unit (301, 305) from a first cellular communication system (201) to a second cellular communication system (203). The first communication system is for example a UMTS communication system supporting a plurality of connections, and the second communication system is for example a GSM communication system supporting only a single connection. The handover comprises forming a handover connection 219 to the subscriber unit (301,305) through the second communication system and handing one of the connections under the first communication system over to this connection. Rather than dropping the remaining connections, they are entered into a holding state. After the handover, one of the connections on hold may be entered into an active state by associating the handover connection (219) with this connection.

25 Claims, 3 Drawing Sheets

METHOD AND APPARATUS FOR HANDING OVER A SUBSCRIBER UNIT BETWEEN CELLULAR COMMUNICATION SYSTEMS

REFERENCE TO RELATED APPLICATION

The present application claims priority from PCT Application No. PCT/EP2003/050688, entitled "A METHOD AND APPARATUS FOR HANDING OVER A SUBSCRIBER UNIT BETWEEN CELLULAR COMMUNICATION SYSTEMS," filed Oct. 3, 2003, which is commonly owned and incorporated herein by reference in its entirety, and which claims priority to EPC Application No. 02292562.2 filed Oct. 17, 2002.

FIELD OF THE INVENTION

The invention relates to a method and apparatus for handing over a subscriber unit between cellular communication systems and in particular to handovers from a third generation cellular communication system to a second generation cellular communication system.

BACKGROUND OF THE INVENTION

Figure 1:
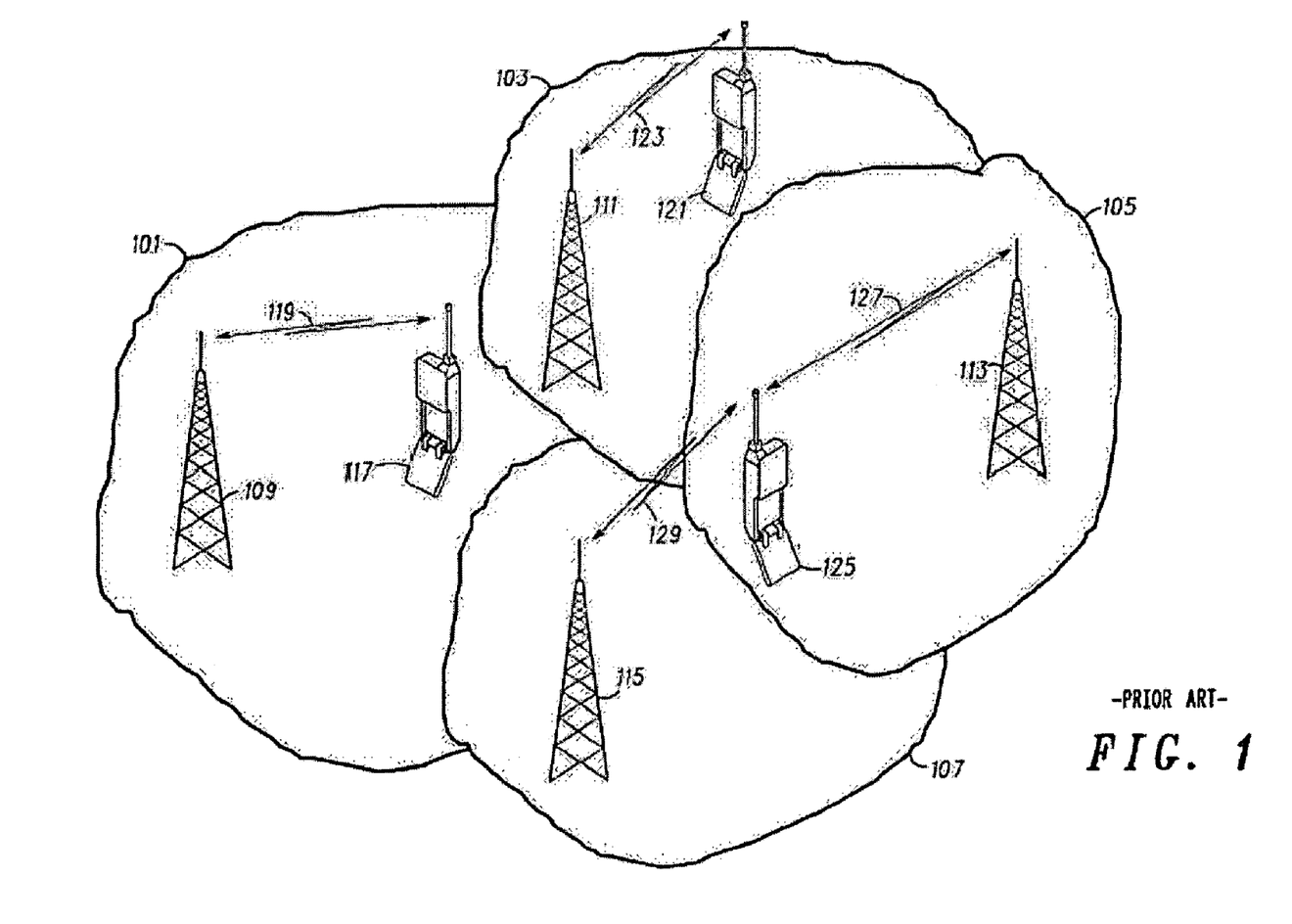
FIG. 1 is an illustration of a cellular communication system in accordance with the prior art.

FIG. 1 illustrates the principle of a conventional cellular communication system 100 in accordance with prior art. A geographical region is divided into a number of cells 101, 103, 105, 107 each of which is served by base station 109, 111, 113, 115. The base stations are interconnected by a fixed network which can communicate data between the base stations 101, 103, 105, 107. A mobile station is served via a radio communication link by the base station of the cell within which the mobile station is situated. In the example if FIG. 1, mobile station 117 is served by base station 109 over radio link 119, mobile station 121 is served by base station 111 over radio link 123 and so on.

As a mobile station moves, it may move from the coverage of one base station to the coverage of another, i.e. from one cell to another. For example mobile station 125 is initially served by base station 113 over radio link 127. As it moves towards base station 115, it enters a region of overlapping coverage of the two base stations 111 and 113 and within this overlap region it changes to be supported by base station 115 over radio link 129. As the mobile station 125 moves further into cell 107, it continues to be supported by base station 115. This is known as a handover or handoff of a mobile station between cells.

A typical cellular communication system extends coverage over typically an entire country and comprises hundred or even thousands of cells supporting thousands or even millions of mobile stations. Communication from a mobile station to a base station is known as uplink, and communication from a base station to a mobile station is known as downlink.

Currently the most ubiquitous cellular communication system is the $2^{nd}$ generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. A base station may be allocated a single carrier or a multiple of carriers. One carrier is used for a pilot signal which further contains broadcast information. This carrier is used by mobile stations for measuring of the signal level of transmissions from different base stations, and the obtained information is used for determining a suitable serving cell during initial access or handovers. Further description of the GSM TDMA communication system can be found in 'The GSM System for Mobile Communications' by Michel Mouly and Marie Bernadette Pautet, Bay Foreign Language Books, 1992, ISBN 2950719007.

Currently, $3^{rd}$ generation systems are being rolled out to further enhance the communication services provided to mobile users. The most widely adopted $3^{rd}$ generation communication systems are based on Code Division Multiple Access (CDMA) wherein user separation is obtained by allocating different spreading and scrambling codes to different users on the same carrier frequency. The transmissions are spread by multiplication with the allocated codes thereby causing the signal to be spread over a wide bandwidth. At the receiver, the codes are used to de-spread the received signal thereby regenerating the original signal. Each base station has a code dedicated for a pilot and broadcast signal, and as for GSM this is used for measurements of multiple cells in order to determine a serving cell. An example of a communication system using this principle is the Universal Mobile Telecommunication System. (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a UMTS CDMA communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link being part of the air interface. The RAN comprises the base stations, which in UMTS are known as Node Bs, as well as Radio Network Controllers (RNC) which control the Node Bs and the communication over the air interface.

Whereas the GSM system was originally developed with a view to mainly supporting voice services, UMTS has from the outset been developed to provide a wide plurality of different services including different voice communication services and data services. Different services can be set up having different characteristics and specifically with different Quality of Service parameters such as different delays, data rates, target error rates etc. Further, UMTS provides for a plurality of services and connections to be set up between different mobile stations.

The deployment of UMTS will initially be in islands of coverage wherein UMTS base stations provide coverage of selected areas and regions. However, it is expected that most UMTS systems will not provide full or extensive coverage for some time, and therefore it is planned that the gaps in UMTS coverage will be covered by $2^{nd}$ Generation Systems such as GSM. Consequently, multimode mobile stations capable of operating with both GSM and UMTS are being developed as is handover methods between the two systems.

However, GSM provides limited services in comparison to UMTS and the handover methods therefore comprise reducing the services and quality of service provided to a user when handing over to GSM. Hence, the handover causes a reduced service level for a user therefore a system for handovers providing improved support of services, functionality and/or performance would be an advantage.

SUMMARY OF THE INVENTION

Accordingly the Invention seeks to mitigate, alleviate or eliminate one or more of the above mentioned disadvantages singly or in any combination.

Accordingly, there is provided a method of handing over a subscriber unit from a first cellular communication system supporting a plurality of connections of the subscriber unit to a second cellular communication system; the method comprising the steps of: entering at least a first connection of said plurality of connections into a holding state; forming a handover connection to the subscriber unit through the second communication system; handing over a second connection of said plurality of connections to the second cellular communication system by associating the second connection with said handover connection; entering said at least first connection into an active state by associating the at least first connection with the handover connection.

An advantage provided by the invention is that upon handover from a first to a second communication system, the handover can be performed for just a single connection while still maintaining all connections of the first communication system. This is especially advantageous when the second communication system is only able to support one connection, as it allows for the remaining connections to be maintained rather than dropped. The connections put into a holding state can be put into an active state using the handover connection and thus without requiring more than one connection in the second cellular communication system. If the subscriber unit is subsequently handed back to the UMTS communication system, it allows for the connections currently in a holding state to immediately be re-established. Hence, an improved service is provided to the subscriber units in a dual cellular communication system which efficiently accommodates for the different capabilities, services and performance of the different communication systems.

According to a different feature of the invention, the step of entering said at least first connection into an active state comprises switching the handover connection from being with the second connection to being with the at least first connection. Switching between connections provide for a simple and efficient implementation suitable for cellular communication systems.

According to another feature of the invention, the method further comprises the step of selecting the second connection from the plurality of connections in response to at least one characteristic of at least one of the plurality of connections. Advantageously, the connection having a characteristic most suited for being associated with the handover connection can thus be selected as the second connection.

According to another feature of the invention, the characteristic is related to a type of connection and preferably the step of selecting comprises selecting a data service connection in preference to a voice service connection as the second connection. This provides the advantage of minimising the service impact by putting connections into a holding stage as a voice service typically can be continued after the connection has been entered into the active state without unacceptable inconvenience.

According to another feature of the invention, the at least one characteristic comprises at least one characteristic chosen from the group consisting of: a priority; a data rate; a propagation characteristic; an error rate; a transaction identifier; and a time of setup of at least one of the plurality of connections. These parameters provide efficient and practical parameters for selection the second connection.

According to another feature of the invention, the at least first connection is a data connection and the method comprises the steps of storing data of the at least first connection in memory when the at least first connection is in the holding state; and communicating the data stored in said memory when the at least first connection enters the active state. This allows for a data service to be put on hold without any loss of data. The data source for the data service need not stop the data transmission or be informed of the holding state as the data communicated is buffered and forwarded to the subscriber unit when the data connection enters the active state.

According to another feature of the invention, the at least first connection is a data connection and the method comprises the steps of storing data of the at least first connection in memory when the at least first connection is in the holding state; and the subscriber unit retrieving the stored data from the memory by setting up a separate data call. This allows for a data service to be put on hold without any loss of data. The data source for the data service need not stop the data transmission or be informed of the holding state as the data communicated is stored and retrieved by the subscriber unit. The user of a subscriber unit may have control of when to receive the stored data and this does not require an active connection.

According to another feature of the invention, the method further comprises the step of notifying a user of the subscriber unit of which of the plurality of connections are in a holding state. Thereby the user is informed of the current status and thus may take appropriate action.

According to another feature of the invention, at least one of the plurality of connections is between the subscriber unit and a second communication unit and the method further comprises the step of notifying a user of the second communication unit of which of the plurality of connections are in a holding state. Advantageously, the user of the second communication system is informed of the current status and thus may take appropriate action According to another feature of the invention, the notification is by means of a voice communication if at least one of the plurality of connections is a voice service connection. This is provides an efficient means for notification which is easily interpreted by a user.

According to another feature of the invention, the step of selecting the first connection is in response to a parameter set by an operator of at least one of the first or second cellular communication systems. Advantageously, the operator may control parameters influencing the selection of the second connection thereby allowing the operator increased control over the communication systems and services provided.

According to another feature of the invention, the step of selecting the second connection is in response to a parameter set by a user of the subscriber unit. Advantageously, the user is thus provided with means for influencing which connection should initially be in an active state.

According to another feature of the invention, if the handover to the second cellular communication system is unsuccessful at least one of the plurality of connections is re-established through the first communication system. Hence, the advantage of increased resilience and reduced dropped connection rates is achieved as a connection is only dropped if the handover to the second communication system fails and no support for the connection is available in the first communication system.

According to another feature of the invention, the second cellular communication system comprises a master switch center comprising functionality for selecting the second connection out of the plurality of connections. This provides for a very efficient implementation suitable for most cellular communication systems.

According to another feature of the invention, the method is operated in a single integrated master switch centre for the first cellular communication system and the second cellular communication system. This provides for the advantage of allowing for an efficient and relatively low complexity implementation wherein the characteristics and functionality of both communication systems can be considered and utilised.

The second communication system may be operable to only support one connection for each served subscriber unit and the connections are preferably circuit switched connections.

Preferably, the first cellular communication system is a Third Generation Cellular Communication System such as a Universal Mobile Telecommunication System (UMTS).

Preferably the second cellular communication system is a Second Generation Cellular Communication System such as the Global System for Mobile communication (GSM) cellular communication system.

According to a second aspect of the invention, there is provided an apparatus for handing over a subscriber unit from a first cellular communication system supporting a plurality of connections of the subscriber unit to a second cellular communication system; the apparatus comprising: means for entering at least a first connection of said plurality of connections into a holding state; means for forming a handover connection to the subscriber unit through the second communication system; means for handing over a second connection of said plurality of connections to the second cellular communication system by associating the second connection with said handover connection; means for entering said at least first connection into an active state by associating the at least first connection with the handover connection.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

The invention will in the following be described with specific reference to handovers between the UMTS communication system standardised by the Third Generation Partnership Project (3GPP) and the GSM communication system standardised by the European Telecommunication Standards Institute (ETSI), but it will be apparent that the invention is not limited to this application but is equally applicable to many other communication systems and handovers.

Figure 2:
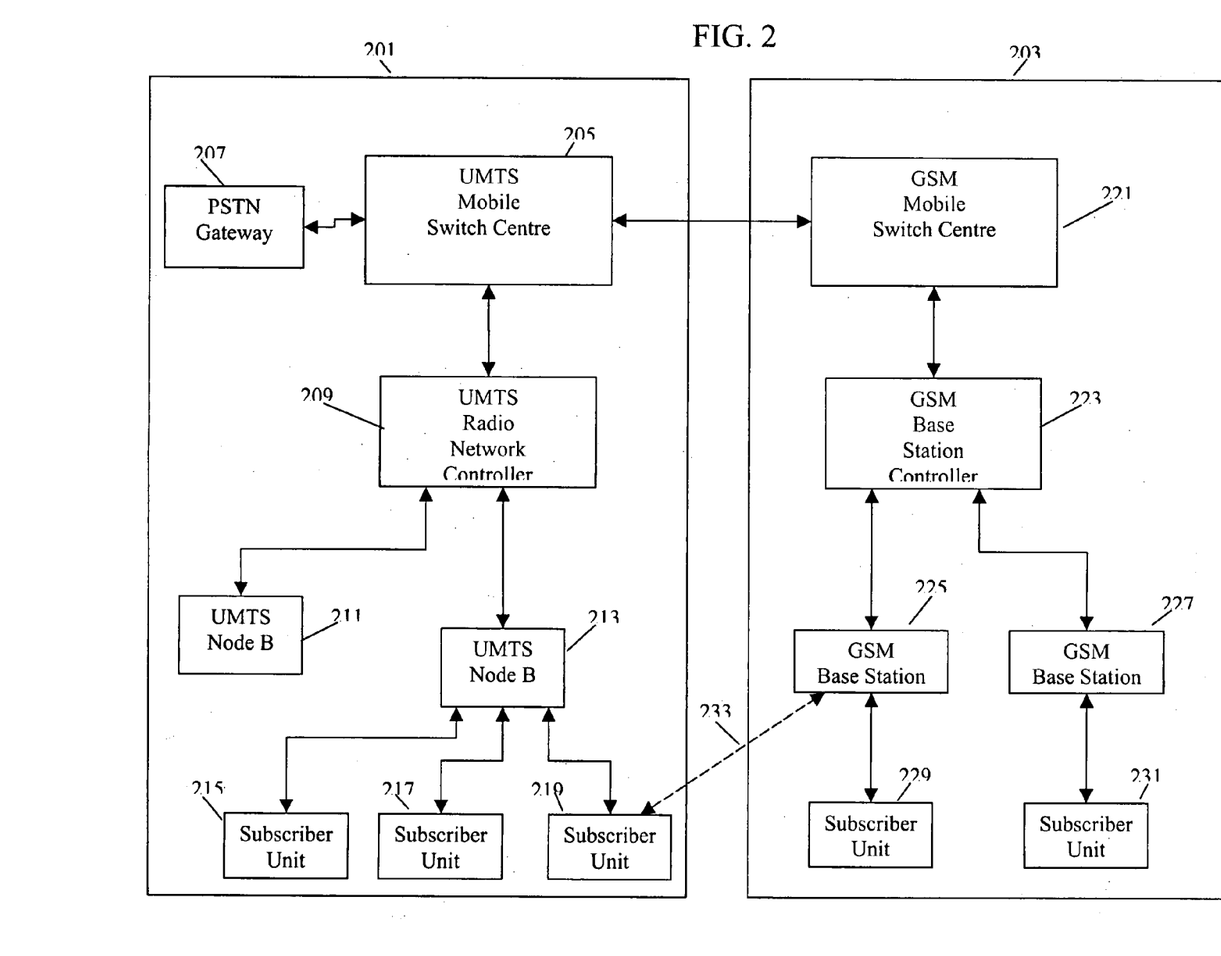
FIG. 2 is an illustration of an architecture of two cellular communication systems to which an embodiment of the invention may apply.

FIG. 2 is an illustration of architectures of cellular communication systems 201, 203 to which an embodiment of the invention may apply.

A first communication system 201 is a UMTS communication system supporting a plurality of UMTS subscriber units. The second communication system 203 is a GSM communication system supporting a plurality of GSM subscriber units. In addition both communication systems 201, 203 are able to support a number of multi mode subscriber units comprising both GSM and UMTS functionality. A subscriber unit may typically be a wireless user equipment, a mobile station, a communication terminal, a personal digital assistant, a laptop computer, an embedded communication processor or any communication element communicating over the air interface.

The UMTS communication system comprises a UMTS Mobile Switch Centre (MSC) 205 which among other things is in charge of switching the incoming data streams from different subscriber units to the appropriate output streams for the call destination. Specifically, the MSC 205 may switch the data to another MSC. Further, the MSC 205 is, in the example shown, a Gateway—MSC comprising a gateway interface for interfacing to an external network which in this case is a Public Standard Telephone Network (PSTN) 207. The MSC further comprises functionality for performing various maintenance and operational functions including authentication and billing.

The UMTS MSC 205 is connected to a plurality of UMTS Radio Network controllers (RNCs) 209 of which one is shown in FIG. 2. The RNC 209 is connected to a number of UMTS base stations, which are known as Node Bs 211, 213, of which two are shown in FIG. 2. The RNC 209 performs many of the control functions related to the air interface of the UMTS communication system 201 including radio resource management and routing of data to and from appropriate Node Bs 211, 213. An RNC and associated Node Bs is known as a Radio Network System (RNS).

The Node Bs 211,213 comprise much of the functionality required for supporting subscriber units over the radio air interface. As such, the Node Bs comprise radio transmitters, receivers and the required control circuitry for communicating with a plurality of subscriber units. FIG. 2 illustrates three UMTS subscriber units 215, 217, 219 communicating with one of the Node Bs 213. The communication is by means of radio communication in accordance with the Technical Specifications for the UMTS communication system. Typically, each Node B will support a high number of subscriber units simultaneously.

The GSM communication system 203 comprises a GSM Mobile Switch Centre (MSC) 221 which generally performs the same functions in the GSM communication system 203 as the UMTS MSC 205 performs for the UMTS communication system 201. It thus provides switching, operations and maintenance functions as well as interfacing to external communication systems.

The GSM MSC 221 is connected to a GSM Base Station Controller (BSC) 223 which provides control functionality for the base stations including channel allocation, channel configuration management and handover control. The BSC 223 is connected to a plurality of GSM base stations 225, 227 known as Base Transceiver Stations (BTSs) in GSM. The BTSs 225, 227, of which two are shown in FIG. 2, comprise the functionality required for communicating over the GSM air interface to GSM subscriber units including the required radio transmitters, receivers and control functionality. In the example of FIG. 2, each of the illustrated BTSs 225, 227 are shown to communicate with a single GSM subscriber unit 229,231, but typically each BTS 225, 227 simultaneously communicate with a high number of subscriber units.

In the example of FIG. 2, one of the UMTS subscriber units 219 is a dual mode subscriber unit which is operable to communicate according to both the UMTS and the GSM communication standards. If the dual mode subscriber unit 219 moves out of the coverage area of the supporting Node B 213 it will attempt to handover to another Node B, and thus remain on the UMTS communication system 201. However, it may be preferred, for example because the dual mode subscriber unit 219 is moving into an area with insufficient UMTS coverage, to handover to a GSM BTS. In this case, it will be attempted to set up a suitable communication link between the dual mode subscriber unit 219 and a GSM BTS 225 as illustrated by the connection 233 in FIG. 2.

However, as the two communication systems 201, 203 are not identical they have different characteristics and capabilities. In particular, the GSM cellular communication system 203 does not provide the same variety and performance of services as can be achieved in a UMTS communication system 201. Specifically, it is possible to set up a plurality of connections to a subscriber unit in a UMTS cellular communication system. Hence, in UMTS, each connection is terminated in the subscriber unit. The plurality of connections may have different characteristics, and thus different services may simultaneously be set up for a subscriber unit including for example a mix of voice and data services that may further have different characteristics. However, in GSM only one physical connection is allowed for each subscriber unit on the interface between the GSM MSC 221 and the BSC 223, and therefore only one simultaneous connection is set up to the dual mode subscriber unit 219 through the GSM communication system 203.

In accordance with a preferred embodiment of the invention, a subscriber unit 219 having a plurality of associated connections is handed over from a first cellular communication system, such as the UMTS communication system 201, to a second cellular communication system, such as the GSM communication system 203, by the performing the steps of entering at least a first connection of said plurality of connections into a holding state; forming a handover connection to the subscriber unit 219 through the second communication system 203; handing over a second connection of said plurality of connections to the second cellular communication system 203 by associating the second connection with said handover connection; and entering the at least first connection into an active state by associating the at least first connection with the handover connection.

Figure 3:
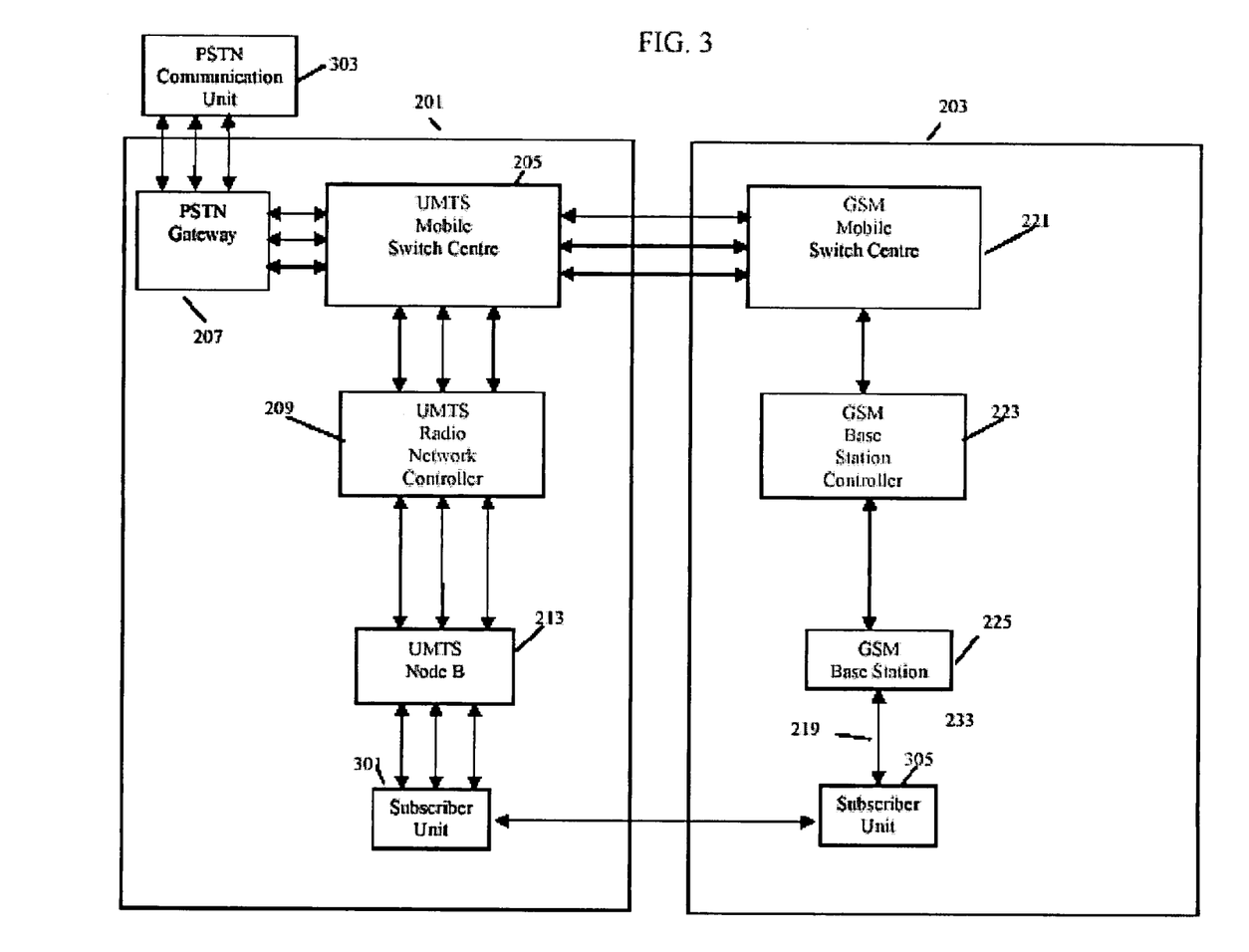
FIG. 3 is an illustration of handover situation to which a preferred embodiment of the invention may be applied.

FIG. 3 is an illustration of handover situation to which a preferred embodiment of the invention may be applied. For clarity and brevity, only the elements of the cellular communication systems of FIG. 2 which are directly involved in supporting a specific subscriber unit are shown. In the example of FIG. 3, a subscriber unit 301 is communicating over three circuit switched connections with a second communication unit 303. The second communication unit 303 is in this example a PSTN communication unit, which is connected to the UMTS cellular communication system through the PSTN Gateway 207. The second communication unit 303 may thus for example be a bridge conference system or in the specific example may be a network unit of the PSTN supporting three separate telephone connections.

It will be apparent, that the second communication unit 303 could be any suitable communication unit and could be associated with the cellular communication system in any suitable way. As such, the second communication unit could be a communication unit associated with a different external network, such as the internet, or could be associated with the first communication system, such as for example a second UMTS subscriber unit. Further, it will be apparent that instead of a single second communication unit, the subscriber unit 301 could be in communication with a plurality of communication units, and that these further could be different communication units having different characteristics, capabilities and associations with the cellular communication system(s). As such, the second communication unit 303 could be associated with the second communication system.

In the specific example of FIG. 3, the subscriber unit 301 is communicating through three circuit switched voice connections. Hence, the subscriber unit 301 is simultaneously supporting three voice services. For example, the subscriber unit 301 may in this case be a conference bridge unit that maintains a conference between four users through the three connections. In order to support the three circuit switched connections, at least three connections are established for the subscriber unit 301 between the subscriber unit 301 and the serving Node B 213, between the serving Node B 213 and the serving RNC 209, between the serving RNC 209 and the UMTS MSC 205, between the UMTS MSC 205 and the PSTN Gateway 207 and between the PSTN gateway 207 and the PSTN communication unit 303.

In the present example, the subscriber unit 301 moves out of the coverage area of the UMTS communication system 201. In the illustrated example, the subscriber unit 301 is a dual mode subscriber unit and therefore it may be attempted to set up a communication with the GSM communication system 203. For this reason, the subscriber unit 301 measures the pilot signals (such as the BCCH broadcast transmissions) of the neighbouring GSM BTSs in the same way as a conventional GSM mobile station does. In addition, the subscriber unit 301 measures beacon signals of the neighbouring UMTS Node Bs. These measurements are reported back to the UMTS cellular communication system, wherein it is determined if a handover is necessary, and if so to which base station the handover should be directed to. If the reported measurements indicate that no suitable UMTS handover candidate is available but that the subscriber unit may be supported by a GSM BTS, a handover is made to this BTS. The selection of which base station to handover to is preferable determined in the same manner as for a standard GSM mobile station. Specifically the base station being reported with the highest measured BCCH signal level is chosen.

When a GSM base station has been selected, the necessary signalling and information is exchanged between the communication systems and the subscriber unit, within each of the communication systems and between the communication systems. Specifically, in the preferred embodiment, the handover controller determining whether to handover to the GSM communication system is located in the UMTS cellular communication system 201, whereas the handover controller for determining which GSM BTS to handover to is located in the GSM communication system 203. In this case, the subscriber unit 301 first reports the measurement values to the RNC 209. The RNC 209 processes the measurements together with other characteristics to determine whether a handover is necessary and whether such a handover should be to the GSM communication system 203. In this case, a handover request is transmitted to the UMTS MSC 205 and from there to the GSM MSC 221. The GSM MSC 221 processes the information and selects the suitable GSM BTS 225. It then communicates the characteristics of this BTS 225 back to the RNC 209 in the UMTS communication system 201. The RNC 209 forwards the necessary information to the subscriber unit 301 through the Node B 213. Upon receiving the information, the subscriber unit 301 proceeds to access the GSM communication system 203 by transmitting access messages over the GSM air interface. The GSM cellular communication 201 system then forms a GSM communication link with base station. This is in FIG. 3 illustrated by the subscriber unit 305 which represents the subscriber unit 301 following successful handover to the GSM communication system 203. Thus in FIG. 3, the subscriber units 301 and 305 represents the same dual mode subscriber unit before and after handover, i.e. in the UMTS mode and GSM mode respectfully. Once the GSM communication link has been successfully set up, the UMTS communication system 201 is informed, and it then proceeds to terminate the UMTS connections to the subscriber unit 301.

It will be appreciated that the specific embodiment described above is merely an example of how a handover could be implemented. For brevity and clarity, only a general implementation possibility has been described, and in practical UMTS and GSM communication systems other methods and signal exchanges may be used.

It will thus be apparent that any suitable method for determining and selecting that a handover is required, which communication system to hand over to, and which base station of that communication system to hand over to may be used without detracting from the invention. Likewise any suitable method of implementing the handover method may be used including any suitable signalling protocol, distribution of handover functionality and access mechanism.

However, as illustrated in FIG. 3, the communication link of the GSM communication system 203 only supports one circuit switch connection. Conventionally, handover from a UMTS communication system is therefore associated with handover of just one connection while the remaining connections are released or dropped.

In a preferred embodiment of the current invention, all the connections supported by the UMTS communication system 201 are forwarded to the GSM cellular communication system 203. Thus as illustrated in FIG. 3, in the described example three connections are established between the UMTS MSC 205 and the GSM MSC 221, one for each of the connections from the PSTN communication unit 303. However, from the GSM MSC 221 through the BSC 223 to the BTS 225 only one connection is established.

In the described embodiment, the GSM MSC 221 thus sets up a single handover connection from the GSM MSC 221 to the subscriber unit 305. It then performs a handover by switching this handover connection to one of the connections from the UMTS MSC 205. Further, the GSM MSC 221 comprises functionality for entering the remaining connections into a holding state. In the holding state, the connection is maintained to the second communication unit 303 but no data is communicated to the subscriber unit 305. For a voice call, the holding state may simply comprise putting the call on hold, which may be achieved by transmitting a holding indication to the second communication unit thereby informing the user of that connection that the call is on hold.

Following the inter-system handover, the subscriber unit 305 is thus provided with a single connection out of the plurality of original connections. However, in contrast to conventional methods, the remaining connections are not dropped but are still maintained. The GSM MSC 221 further comprises functionality for switching the handover connection between the GSM MSC 221 and the subscriber unit 305 to one of the connections on hold. Thus, following the handover, a connection in a holding state may be entered into an active state by switching the handover connection from the active connection to a connection on hold thereby allowing communication to the subscriber unit 305 from this connection. The previously active connection is preferably put into a holding state.

Hence, in accordance with the preferred embodiment, the handover method allows all connections supported in the UMTS cellular communication system to be maintained when handing over to a GSM cellular communication system. Communication can be maintained for all connections by switching a single GSM connection between the plurality of connections. A significant advantage of this approach, is that if the subscriber unit subsequently performs a handover back to the UMTS communication system, all the original connections can readily be re-established.

It will be appreciated that the above description merely sets out a specific example embodiment, and that many variations and modifications may be made without detracting from the invention. For example, although the association between the plurality of UMTS connections and the one GSM handover connection is preferable made by a simple switching operation, other embodiments may use more complex methods including operating a queue allocation scheme or multiplexing scheme.

In the preferred embodiment, the selection of which connection out of the plurality of connections to handover is in response to at least one characteristic of one of the connections. Specifically, the characteristic is related to a type of connection of the plurality of connections. Thus, the GSM MSC 221 selects the connection to initially associate with the handover connection from a consideration of which types of connections that are comprised in the plurality of connections being supported by the UMTS communication system. In the preferred embodiment, this consideration includes considering whether any of the connections are data service connections and if so selecting a data service connection in preference to a voice service connection as the connection initially being associated with the handover connection. In most communication systems, there is no provision for pausing a data source for a data service whereas a voice call can be put on hold by a simple notification of the user. Thus for a voice call, an interruption in the communication is acceptable if the users are notified thereof, whereas for a data call an interruption in the connection through the communication system(s) will cause loss of data. Hence, by prioritising data service connections above voice service connections, the negative impact of handing a plurality of connections over to a single connection is reduced.

Additionally or alternatively, the selection of the initial connection for the handover can be in response to one or more of the following parameters:

A priority of a connection: The communication system may have means of prioritising different connections, and the selection of the initially active connection may be determined as the one having the highest priority. The priority may be determined directly by a priority parameter or may be determined indirectly by evaluation of other parameters. For example, quality of service parameters for the connections may indicate how highly they are prioritised. For example, data connections having strict error and delay requirements may be prioritised higher than data connections having less strict requirements.

A data rate: The initial connection may be selected in accordance with the data rate of the service supported by a connection. The connection may simply be selected as the connection having the highest data rate but in the preferred embodiment, it is selected as the data rate which most closely corresponds to the data rate that is provided by the handover connection. Thus the initially active connection will be selected as the connection that will be the least affected by the handover.

An error rate: The selection of the initially active connection may for example be in response to an error rate of the service of the connection. This error rate may both be a required one or a measured error rate. Preferably, the connection is selected as that having a required error rate that most closely corresponds to a current error rate measured for the connection over the GSM air interface.

A transaction identifier: A transaction identifier is used by layer 3 of the UMTS communication system to identify different connections and transactions. This identification number may directly be used to select an initial connection, for example by selecting the connection that has the lowest transaction identifier.

A time of setup of at least one of the plurality of connections: Thus the selection of the initially active connection may be in response to the time of setting up the connections. Specifically, the initially active connection may be selected as the first connection that was set up for the communication system. In other embodiments, the initially active connection may be selected as the one most recently having been set up.

In some embodiments, the selection of the initially active connection is in response to a parameter set by an operator of at least one of the first or second cellular communication systems. Thus, a network operator may control the handover mechanism by for example establishing a prioritised list of parameters in response to which the initial connection is selected. An example of such a list would be to first choose between connections depending on whether they are data service connections or voice service connections. If there is more than one data service connections, the operator may set up selection between these to be in response to the data rate such that the connection having a data rate most closely resembling the one of the handover connection is selected.

In other embodiments, the selection of the initially active connection is additionally or alternatively in response to a parameter set by a user of the subscriber unit. Hence, in this embodiment the user is directly involved in the selection of the initially active connection thereby allowing the user control over which connections are put on hold and which connection remains active. In a simple embodiment, the user is simply presented with a list of available connections and asked to select one of these.

In accordance with an embodiment of the invention, at least one of the connections entered into a holding state is a data connection supporting a data service and specifically a circuit switched data service. In this embodiment, the method of handover further comprises storing data of the at least first connection in memory when the at least first connection is in the holding state; and communicating the data stored in said memory when the at least first connection enters the active state. Hence, in this embodiment, the MSC further comprises a suitable data storage memory. As the data connection is put into the holding state, the data received from the UMTS communication system is stored in the data storage memory. Consequently, when the handover connection is switched to the data connection, the stored data may be downloaded to the subscriber unit through the handover connection. In accordance with this embodiment, data buffering is thereby provided resulting in no data being lost during the handover. Hence, the operation of the originating data source is not affected by any handovers between the different communication systems. This embodiment is particularly suited for delay insensitive data services such as for example email services.

Additionally or alternatively, the subscriber unit may retrieve the stored data from the memory by setting up a separate data call. Thus, in this embodiment, the data from the data connection is stored and can be retrieved independently of the current connections. Consequently, if the subscriber unit has capability therefor, it may set up a different independent connection over the GSM air interface to the GSM MSC and download the data from the storage means. Thereby, the subscriber unit has control over the download of the buffered data, and it can retrieve the stored data while another of the plurality of connections is active via the handover connection.

In the preferred embodiment, the handover method comprises the step of notifying a user of the subscriber unit of which of the plurality of connections are in a holding state. Additionally or alternatively, the handover method comprises the step of notifying a user of the second communication unit of which of the plurality of connections are in a holding state. Thus when a connection is put on hold, a notification signal is communicated to the originating communication unit(s) informing it (them) that the connection is put on hold. An originating communication unit is thus informed that real time communication with the subscriber unit is not currently available. The originating communication unit or a user thereof may thus take appropriate action, such as for example pausing the transmission. In a simple embodiment, where the connection supports a voice service, the user of the originating communication unit may simple pause his speech until the connection is entered into an active state. Thus a notification of a connection entering an active state is also preferably transmitted to one or both of the subscriber unit and the originating communication unit.

Likewise, the subscriber unit or a user thereof may upon notification that one or more of the connections are put on hold take appropriate action. In the simple case of voice communications, the user of the subscriber unit will simply refrain from speaking to the party of a connection put on hold. Hence, in the simple case of the subscriber unit acting as a conference bridge, only one voice connection will be active at a time when supported by the GSM communication system. The user of the subscriber unit with proceed by only speaking to the party of the currently active voice call. However, in the preferred embodiment, the user of the subscriber unit is further provided an indication of the voice calls currently on hold and with switching means allowing him to manually select which call is to be in the active state. Thus, the method of the preferred embodiment comprises switching of the handover connection between the plurality of subscriber units in response to a user input of a user of the subscriber unit. Hence, the user may continue to communicate with all parties by sequentially switching between the connections available. In embodiments where the connections support voice services, the notification is preferably by means of a voice communication, such as for example a synthesized voice message indicating which connections are on hold.

In accordance with one embodiment of the invention, the method further determines if the handover to the second cellular communication system, such as the GSM cellular communication system described above, is unsuccessful. If so, at least one of the plurality of connections is re-established through the first communication system, such as the UMTS communication system described above. Hence, if the handover to the GSM communication system is not successful, the UMTS RNC 209 will Attempt to maintain and re-establish the connection through the UMTS communication system. This may be through the previously serving Node B 213 or through another Node B. Hence, in this embodiment, a call is not dropped because a connection to the GSM communication system cannot be established but only if additionally the connection cannot be re-established through the UMTS communication system.

It will be apparent that the different functionality may be implemented in any suitable physical, logical and structural location. As such, the association between the handover connection and one of the plurality of connections may be made in the first or second communication system. However, preferably the association comprises a switching function implemented in the GSM MSC. In the preferred embodiment, the GSM MSC further comprises the functionality for selecting the initially active connection.

In the preferred embodiment, a connection that has been established under one MSC such as the UMTS MSC, remains under the control of that MSC following a handover. The original MSC is thus an anchor MSC, which continues to be responsible for gathering and processing billing data as well as the signalling and overall call establishment and maintenance. In the preferred embodiment, the MSCs of the two cellular communication systems are furthermore an integrated MSC comprising both the UMTS and GSM functionality. In this embodiment, the interface between the two communication systems is thus implicitly implemented in the functionality of the integrated MSC. This allows for a high degree of interaction between the communication systems and for a very efficient handover processing.

In the preferred embodiment the first cellular communication system is thus preferably a Third Generation Cellular Communication System such as UMTS, and the second communication system is a Second Generation Cellular Communication System, such as GSM. Therefore the operation of the handover is in accordance with the technical specifications of the UMTS and GSM communication respectively. In particular the entering of one or more of the connections into a holding state is performed in accordance with the $3^{rd}$ Generation Partnership Project (3G PP) Technical Specifications 22.083, 23.083 and/or 24.083, and the entering of one of these connections into an active state is performed in accordance with the $3^{rd}$ Generation Partnership Project (3G PP) Technical Specification 24.083. However, it will be clear that in other embodiments, other communication systems may be involved and other standards may be adhered to.

The invention can be implemented in any suitable form including hardware, software, firmware or any combination of these. However, preferably, the invention is implemented as computer software running on one or more data processors. The elements and components of an embodiment of the invention may be located in the core network, the radio access network or any suitable physical or functional location. Indeed the functionality may be implemented in a single unit, in a plurality of units or as part of other functional units. As such, the invention may be implemented in a single unit or may be physically and functionally distributed in the network.

Although the present invention has been described in connection with the preferred embodiment, it is not intended to be limited to the specific form set forth herein. Rather, the scope of the present invention is limited only by the accompanying claims.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. Moreover, although the foregoing description refers to preferred embodiments, such indications of preference are not to be construed as a critical, required, or essential feature or element of any or all the claims.

The invention claimed is:

1. A method of handing over a plurality of connections of a subscriber unit from a first cellular communication system supporting the plurality of connections of the subscriber unit to a second cellular communication system having capability for supporting only one connection, the method comprising the steps of:
    entering at least a first connection of said plurality of connections into a holding state directed by the second communication system;
    forming a handover connection to the subscriber unit through the second cellular communication system;
    handing over a second connection of said plurality of connections to the second cellular communication system by associating the second connection with said handover connection;
    entering said at least first connection into an active state by switching the at least first connection with the handover connection while placing the previously active second connection on hold; and
    forwarding all the connections directly from the first communication system to the second communication system.

2. A method as claimed in claim 1 wherein the step of entering includes multiplexing all of the connections with the handover connection.

3. A method as claimed in claim 1 further comprising the step of selecting the second connection from the plurality of connections in response to at least one characteristic of at least one of the plurality of connections.

4. A method as claimed in claim 3 wherein the characteristic is related to an error rate of the second connection.

5. A method as claimed in claim 3 wherein the step of selecting comprises selecting a data service connection in preference to a voice service connection as the second connection.

6. A method as claimed in claim 3 wherein the at least one characteristic comprises at least one characteristic chosen from the group consisting of:
    a) a priority;
    b) a transaction identifier; and
    c) a time of setup of at least one of the plurality of connections.

7. A method as claimed in claim 1 wherein the at least first connection is a data connection and the method comprises the further steps of:
    storing data of the at least first connection in memory when the at least first connection is in the holding state; and
    communicating the data stored in said memory when the at least first connection enters the active state.

8. A method as claimed in claim 1 wherein the at least first connection is a data connection and the method comprises the further steps of:
    storing data of the at least first connection in memory when the at least first connection is in the holding state; and
    the subscriber unit retrieving the stored data from the memory by setting up a separate data call.

9. A method as claimed in claim 1 further comprising the step of notifying a user of the subscriber unit of which of the plurality of connections are in a holding state.

10. A method as claimed in claim 9 wherein the notification is by means of a voice communication if at least one of the plurality of connections is a voice service connection.

11. A method as claimed in claim 1 wherein at least one of the plurality of connections is between the subscriber unit and a second cellular communication unit and further comprising the step of notifying a user of the second cellular communication unit of which of the plurality of connections are in a holding state.

12. A method as claimed in claim 1 further comprising the step of selecting the second connection in response to a parameter set by an operator of at least one of the first or second cellular communication systems.

13. A method as claimed in claim 1 further comprising the step of selecting the second connection in response to a parameter set by a user of the subscriber unit.

14. A method as claimed in claim 1 wherein if the handover to the second cellular communication system is unsuccessful at least one of the plurality of connections is re-established through the first cellular communication system.

15. A method as claimed in claim 14 wherein the first communication system maintains control of the connection in the second communication system following a handover.

16. A method as claimed in claim 1 wherein the second cellular communication system comprises a master switch center comprising functionality for selecting the second connection out of the plurality of connections.

17. A method as claimed in claim 1 wherein the method is operated in a single integrated master switch centre for the first cellular communication system and the second cellular communication system.

18. A method as claimed in claim 1 wherein the second cellular communication system is operable to only support one connection for each served subscriber unit.

19. A method as claimed in claim 1 wherein the plurality of connections is circuit switched connections.

20. A method as claimed in claim 1 wherein the second cellular communication system is a Second Generation Cellular Communication System.

21. A method as claimed in claim 20 wherein the second cellular communication system is a Global System for Mobile communication (GSM) cellular communication system.

22. A method as claimed in claim 1 wherein the first cellular communication system is a Third Generation Cellular Communication System.

23. A method as claimed in claim 22 wherein the first cellular communication system is a Universal Mobile Telecommunication System (UMTS).

24. A method as claimed in claim 23 wherein the step of entering said at least first connection into an active state is performed in accordance with the $3^{rd}$ Generation Partnership Project (3G PP) Technical Specification 24.083.

25. An apparatus for handing over a plurality of connections of a subscriber unit from a first cellular communication system supporting the plurality of connections of the subscriber unit to a second cellular communication system having capability for supporting only one connection; the apparatus comprising:
   means for forwarding all the connections directly from the first communication system to the second communication system;
   means for entering at least a first connection of said plurality of connections into a holding state directed by the second communication system;
   means for forming a handover connection to the subscriber unit through the second cellular communication system;
   means for handing over a second connection of said plurality of connections to the second cellular communication system by associating the second connection with said handover connection;
   means for entering said at least first connection into an active state by switching the at least first connection with the handover connection while placing the previously active second connection on hold.

* * * * *